United States Patent [19]
Kivelä

[11] Patent Number: 5,303,404
[45] Date of Patent: Apr. 12, 1994

[54] ADJUSTABLE BANDWIDTH IN A RADIOTELEPHONE

[75] Inventor: Seppo K. Kivelä, Salo, Finland

[73] Assignee: Nokia Mobile Phones Ltd., Salo, Finland

[21] Appl. No.: 779,347

[22] Filed: Oct. 17, 1991

[51] Int. Cl.⁵ .................................. H04B 1/16
[52] U.S. Cl. .................... 455/200.1; 455/266; 455/315
[58] Field of Search ............. 455/76, 196.1, 197.1, 455/200.1, 207, 208, 266, 314, 315

[56] References Cited

U.S. PATENT DOCUMENTS 3,953,802  4/1976  Morris et al.
4,262,361  4/1981  Hauer ............................ 455/266
4,267,605  5/1981  Matsuzawa et al. .......... 455/266

FOREIGN PATENT DOCUMENTS 2215565  9/1989  United Kingdom ........... 455/266

Primary Examiner—Reinhard J. Eisenzopf
Assistant Examiner—Chi Pham
Attorney, Agent, or Firm—Darby & Darby

[57] ABSTRACT

The frequency of a first local oscillator signal (1.LO) is offset in reference to the center frequency of a first bandpass filter (4), and the frequency of a second local oscillator signal (2.LO) is offset in reference to the center frequency of a second bandpass filter (7). The frequency offsets are selected so that only a portion (x, y) of the filter (4, 7) bandwidths (bw, BW) will add to an "imaginary" effective narrow bandwidth (NBW). The amounts of frequency offset are continuously adjustable by programmable controller.

10 Claims, 2 Drawing Sheets

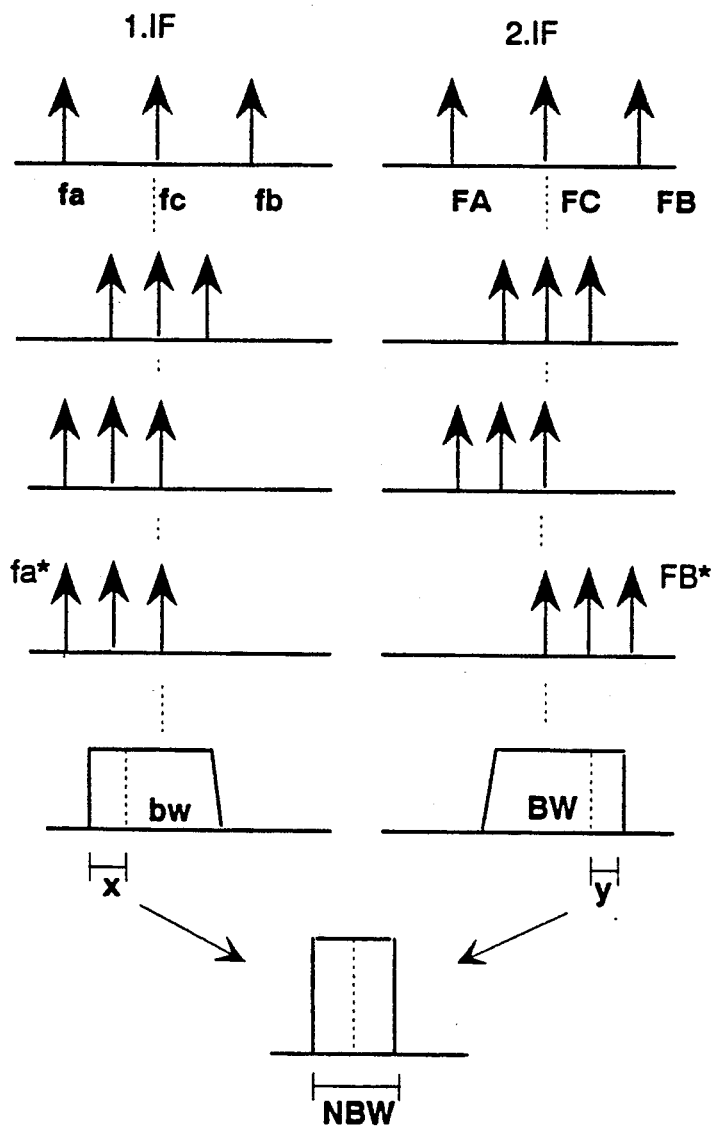

ADJUSTABLE BANDWIDTH IN A RADIOTELEPHONE

BACKGROUND OF THE INVENTION

The present invention relates to a method and apparatus for adjusting the operating bandwidth in a radiotelephone for operation in a plurality of radiotelephone systems.

Radiotelephones, and more particularly cellular radiotelephones, typically operate on only one type of cellular telephone system, for instance, the European GSM (Groupe Special Mobile) or the proposed U.S. system. Prior art telephones that are capable of use in different radiotelephone systems have been equipped with multiple transceivers. U.S. Pat. No. 4,972,455 permits use of different systems by using a transceiver having a dual bandwidth receiver with different filters in the intermediate frequency (IF) section. The filters have different bandwidths and are switchably selected, depending on which cellular service is available. This patent discloses two fixed filters which limit the use of the radiotelephone to systems and applications determined by the selected filter characteristics. Switches may also give rise to crosstalk effects. Thus, there is felt a need for a radiotelephone with a more flexible selection of the operating characteristics.

OBJECTS OF THE INVENTION

Accordingly, it is an object of the present invention to provide a new method and apparatus allowing the operating bandwidth in a radiotelephone receiver to be easily adjusted for use in a plurality of systems without the drawbacks of the prior art.

SUMMARY OF THE INVENTION

In the present invention, the frequency of a first local oscillator signal is offset in reference to the center frequency of a first bandpass filter, and the frequency of a second local oscillator signal is offset in reference to the center frequency of a second bandpass filter, whereby the frequency offsets are selected so that each filter will attenuate one channel adjacent the desired channel. The amount of frequency offset is continuously adjustable by programmable controlling means. Thus, the present invention permits the radiotelephone to operate in a system with wide channel spacing, and in a system with narrower channel spacing by adjusting the operating bandwidth of the radiotelephone appropriately.

BRIEF DESCRIPTION OF THE DRAWINGS

FIGS. 2a-2f schematically present frequency spectra, which explain how local oscillator frequencies are offset in order to produce a narrow operating bandwidth in accordance with the invention, with filters that have essentially broader bandwidths.

DETAILED DESCRIPTION OF THE PREFERRED EMBODIMENT

Figure 1:
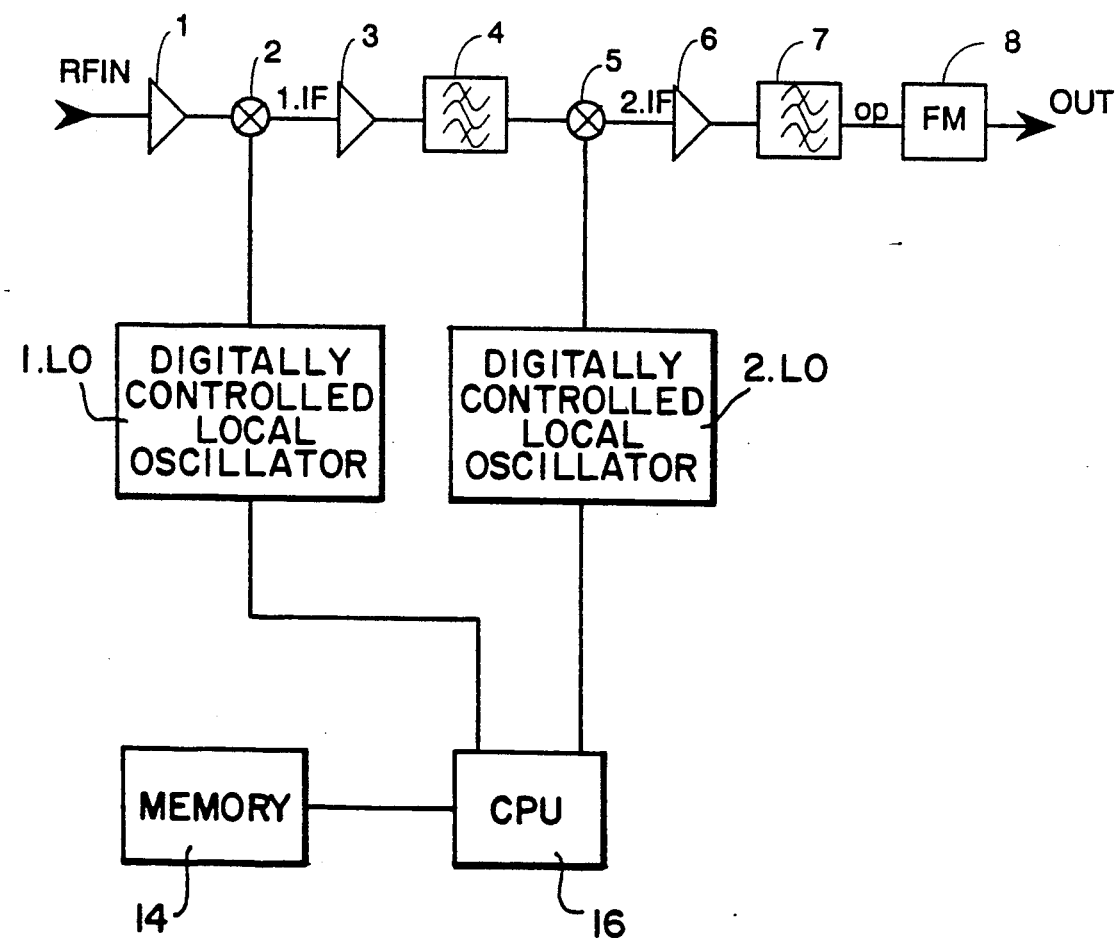
FIG. 1 is a block diagram of the receiving section in a radiotelephone embodying the present invention.

Referring to FIG. 1 there is schematically illustrated a block diagram of the receiving section in a cellular radiotelephone. In the embodiment shown, an RF-signal (RFIN) containing a desired channel signal (fc) and neighboring channel signals (fa, fb) is connected to the input amplifier 1 and then to a first mixer 2. The mixer 2 also receives a local oscillator signal 1.LO from a first local oscillator 10. The mixer 2 outputs a first intermediate frequency signal 1.IF to the bandpass filter 4 and to the second mixer 5. The second mixer 5 also receives a second local oscillator signal 2.LO from a second local oscillator 12. The mixer 5 outputs a second intermediate frequency signal 2.IF to the bandpass filter 7 and to the FM-detector 8, which outputs a signal OUT to further circuits of the radiotelephone.

FIG. 2a shows the present invention with wide channel spacing, i.e., 30 kHz. As an example, some channel signals fa, fb and fc with wide channel spacing, i.e., 30 kHz, are shown. The RF-signal (RFIN) is, in this example, 855 MHz. The first oscillator signal 1.LO is 900 MHz. The first IF-signal 1.IF is derived by mixing RFIN with 1.LO, and thus has a center frequency of 45 MHz, e.g., 900 MHz–855 MHz (as discussed below). The bandpass filter 4 has a bandwidth bw=30 kHz (FIG. 2e), which effectively passes only the desired channel signal fc to the next stage. The frequency of the second oscillator is here 44.545 MHz, whereby the center frequency of 2.IF is 0.455 MHz, e.g., 45 MHz–44.545 MHz (as discussed below). In the same manner, the second stage passes only the desired channel FC in the second IF-signal 2.IF. In this operation there is no offset of the local oscillator frequencies.

The signal frequencies are related to each other according to the following general expressions:

$$1.IF = 1.LO - RFIN \quad (1)$$

$$2.IF = 1.IF - 2.LO \quad (2)$$

FIG. 2b shows a second example of the present invention with narrow channel spacing, i.e., 10 kHz. Ordinarily, the three channels fa, fb, fc would pass through the 30 kHz first bandpass filter 4, because they are narrowly spaced. Correspondingly, the three channels FA, FB, FC would pass through the second bandpass filter 7, making correct FM-detection of the desired channel fc/FC impossible. The prior art solution to this problem is to introduce new filters with narrower bandwidths, i.e., about 10 kHz, instead of the broad bandwidth filters 4 and 7.

However, the method according to the invention solves this problem. The first local oscillator 10 and mixer 2 perform the channel selection, the first local oscillator frequency 1.LO is adjusted downwards, in this example by 10 kHz, so that 1.LO=899.990 MHz. Adjusting 1.LO 10 kHz downwards causes the center frequency of 1.IF to be 10 kHz lower. FIG. 2c shows the effect of this, whereby the bandwidth of 1.IF is shifted downwards by 10 kHz (e.g., 899.990 MHz–855 MHz=44.990 MHz), and correspondingly, the channels fa, fb and fc are shifted 10 kHz to the left in the figure. Correspondingly, the channels FA, FB and FC are shifted 10 kHz to the left in the second IF-signal 2.IF. The second step is to offset the second local oscillator signal 2.LO, and in this case by 20 kHz, so that 2.LO=44.525 MHz. Adjusting 2.LO 20 kHz downwards causes the center frequency of 2.IF to be 10 kHz higher than if the mixer frequency was not adjusted. This leads to a second IF-signal 2.IF=0.465 MHz (e.g., 44.990 MHz–44.525), whereby the channels FA, FB and FC are shifted 10 kHz to the right in FIG. 2d.

The bandwidths of the bandpass filters 4 and 7 are kept the same, i.e., 30 kHz, cf. FIG. 2e. Now it can be seen, comparing FIGS. 2d and 2e, that the local oscillator frequency offsets produce the desired result: In the first filter 4, the channel fa on the left side in FIG. 2d is effectively attenuated, and the two other channels, fc and fb, are passed to the next stage. In other words, the channel fa is now off-band, which is indicated by the asterisk, fa* and only fb and fc are passed. In the second stage, that is in the bandpass filter 7, a corresponding attenuation of channel FB is performed, the channel being out of band, FB*. Thus, only FC is passed (FA does not exist because fa was not passed). The net result is that only the desired channel signal FC is now connected to the FM-detector 8.

The local oscillator frequency offsets and the resulting bandwidth reduction are further explained in FIGS. 2e and 2f. In the first filter 4 there remains an effective bandwidth x of the total bandwidth bw, because fa* is off band and fb will be attenuated at the next stage. In a corresponding manner in the second filter 7 there remains an effective bandwidth y of the total bandwidth BW, because FB* is off band. These parts x and y combine to produce an "imaginary" filter, with the narrow bandwidth NBW.

In existing radiotelephones, the first local oscillator usually is digitally controlled, with an adjustable output frequency 1.LO. The digital control is realized with programs contained in the radiotelephone controlling microprocessor (memory 14, CPU 16 in FIG. 1) by methods known per se.

The present method also requires the second local oscillator frequency 2.LO to be digitally controlled in the same manner as 1.LO.

The filter at the higher frequency, i.e., 45 Mhz, requires good selectivity. This is achieved by using crystal filters known per se, which also typically provide assymmetrical bandwidth edge slopes, as is shown in FIG. 2e. The characteristic of the bandwidth of a crystal filter, as shown on the left side in FIG. 2e has the figure a steeper edge than the right side. The 1.IF filter can also be a saw-type filter. The 2.IF filter is typically a ceramic filter having symmetric characteristics. This leads to the narrow net bandwidth NBW in FIG. 2f which has very sharp edges.

In certain cases it would be conceivable to provide a receiver with three IF stages, a so called "triple super", in order to obtain better channel selectivity. In the triple super, the inventive method would be realized by the second and the third IF-states where the 2 and 3.IF filters are ceramic filters.

In the table below, there is shown different frequency combinations, whereby the examples 1 and 2 were discussed above.

TABLE 1

| | Examples of frequency combinations (frequencies in MHz) | | | |
|---|---|---|---|---|
| | Example 1 (wide band) | Desired channel Example 2 (narrow) | Neighboring channel Example 3 (narrow) | Neighboring channel Example 4 (narrow) |
| RFIN | 855 | 855 | 854.990 | 855.010 |
| 1.LO | 900 | 899.990 | 899.990 | 899.990 |
| 1.IF | 45 | 44.990 | 45.000 | 44.980* |
| 2.LO | 44.545 | 44.525 | 45.525 | 44.525 |
| 2.IF | 0.455 | 0.465 | 0.475* | 0.445 |

*off band

It is understood that the frequencies could be selected in many other combinations, in accordance with equations 1) and 2) above.

The main advantage of the present inventive method is that it requires no switches to change the effective channel bandwidth of the receiver. Thereby crosstalk effects introduced by the extra switches are also avoided. By using digitally controlled oscillators, it is easy to programmably adjust the predetermined local oscillator frequency offsets.

I claim:

1. A method for adjusting the operating bandwidth of a radiotelephone receiver to operate selectively with a wide bandwidth and a narrow bandwidth when in a wide bandwidth system and a narrow bandwidth system, respectively, comprising the steps of:

when in a wide bandwidth system,
applying an input signal to a first mixer, said input signal having a desired signal and adjacent channel signals spaced on opposite sides of the desired signal by a wide channel spacing;
applying a first local frequency to the first mixer for producing a first intermediate frequency signal, including the desired signal, at the mixer output;
filtering the first intermediate frequency in a first bandpass filter with a characteristic bandwidth related to the wide channel spacing and centered on the frequency in the intermediate frequency signal that is related to the desired signal;
applying the filtered output to a second mixer;
applying a second local frequency to the second mixer for producing a second intermediate frequency signal, including the desired signal, said second local frequency being independent of said first local signal; and
filtering the second intermediate frequency in a second bandpass filter with a characteristic related to the wide channel spacing and centered on the frequency in the second intermediate frequency related to the desired frequency;

wherein the improvement comprises, when in a narrow bandwidth system;
receiving an input signal having at least a desired signal and adjacent channel signals spaced from each other by a narrow channel spacing;
selecting a first offset value based on the amount of the frequency difference between the wide and narrow channel spacing;
producing a new first local frequency by applying the first offset value to the first local frequency;
supplying the new first local frequency to the first mixer so as to generate a new first intermediate frequency;
filtering the new first intermediate frequency in the first bandpass filter, the first offset value being such that the desired signal passes through the first bandpass filter and at least one adjacent channel signal on one side of the desired signal is attenuated;
selecting a second offset value based on the difference between the wide and narrow channel spacings;
producing a new second local frequency by applying the second offset value to the second local frequency;
supplying the new second local frequency to the second mixer so as to generate a new second intermediate frequency; and
filtering the new second intermediate frequency in the second bandpass filter, the second offset value being such that the desired signal passes and at least one adjacent channel signal on the other side of the desired signal is attenuated.

2. The method according to claim 1, characterized in that the first local frequency and first mixer perform channel selection.

3. The method according to claim 1, characterized in that the first local frequency and first mixer and the second local frequency and second mixer comprise the second and third stages, respectively, in a three-stage mixing arrangement.

4. The method according to claim 1, characterized in that the first and second local frequencies are automatically adjusted by programmable controlling means depending on whether the controlling means detects that the radiotelephone is in a wide bandwidth system or a narrow bandwidth system.

5. The method according to claim 1, characterized in that first and second bandpass filters are crystal filters.

6. The method according to claim 1, characterized in that the first bandpass filter is a crystal filter and the second bandpass filter is a ceramic filter.

7. The method according to claim 1, characterized in that the first bandpass is a saw type filter and the second bandpass filter is a ceramic filter.

8. The method of claim 1, wherein:
  (a) the step of producing the new first intermediate frequency shifts the input signal in a desired direction; and
  (b) the step of producing the new second intermediate frequency shifts the first intermediate frequency in a direction opposite the desired direction.

9. The method of claim 8, wherein the second offset is twice the first offset.

10. The method of claim 8, characterized in that the first and second local frequencies are derived from independent digitally controlled oscillators.

* * * * *